(12) United States Patent
Aoyagi et al.

(10) Patent No.: US 9,332,483 B2
(45) Date of Patent: May 3, 2016

(54) MOBILE STATION AND RADIO BASE STATION

(71) Applicant: NTT DOCOMO, INC., Tokyo (JP)

(72) Inventors: Kenichiro Aoyagi, Tokyo (JP); Wuri Andarmawanti Hapsari, Tokyo (JP); Kohei Kiyoshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/378,762

(22) PCT Filed: Mar. 13, 2013

(86) PCT No.: PCT/JP2013/057067
§ 371 (c)(1),
(2) Date: Aug. 14, 2014

(87) PCT Pub. No.: WO2013/137341
PCT Pub. Date: Sep. 19, 2013

(65) Prior Publication Data
US 2015/0011252 A1    Jan. 8, 2015

(30) Foreign Application Priority Data

Mar. 14, 2012  (JP) ................. 2012-057388

(51) Int. Cl.
*H04W 48/00* (2009.01)
*H04W 48/02* (2009.01)
*H04W 52/02* (2009.01)

(52) U.S. Cl.
CPC .......... *H04W 48/02* (2013.01); *H04W 52/0216* (2013.01); *H04W 52/0229* (2013.01)

(58) Field of Classification Search
CPC ............................. H04W 48/02; H04W 36/30
USPC ........ 455/509, 452.1, 452.2, 515, 434, 552.1, 455/67.11
See application file for complete search history.

(56) References Cited

U.S. PATENT DOCUMENTS

| 2007/0097923 | A1  | 5/2007 | Chaudry et al. |
| 2011/0188455 | A1* | 8/2011 | Suzuki et al. ................. 370/328 |

(Continued)

FOREIGN PATENT DOCUMENTS

| JP | 2010-41630 A | 2/2010 |
| JP | 2010-45746 A | 2/2010 |
| JP | 2012-23706 A | 2/2012 |

OTHER PUBLICATIONS

International Search Report for corresponding International Application No. PCT/JP2013/057067, mailed Apr. 9, 2013 (2 pages).
Written Opinion for corresponding International Application No. PCT/JP2013/057067, mailed Apr. 9, 2013 (4 pages).

(Continued)

*Primary Examiner* — John J Lee
(74) *Attorney, Agent, or Firm* — Osha Liang LLP

(57) ABSTRACT

To suppress increase in the amount of signals due to repetition of transition to a "Preservation state" and return to an "Active state," a mobile station UE according to the present invention includes: a receiving unit 13 configured to receive access restriction information against communication satisfying a predetermined condition during the "Preservation state," from a radio access network; and a transmitting unit 12 configured to transmit an "RRC CONNECTION REQUEST" to the radio access network in a case where the mobile station UE transitions from the "Preservation state" to the "Active state." The transmitting unit 12 is configured to decide whether or not to transmit an "RRC CONNECTION REQUEST" for the communication satisfying the predetermined condition, on the basis of the access restriction information.

4 Claims, 4 Drawing Sheets

(56) References Cited

U.S. PATENT DOCUMENTS

| | | |
|---|---|---|
| 2011/0222451 A1 | 9/2011 | Peisa et al. |
| 2011/0287758 A1* | 11/2011 | Aoyagi et al. ............ 455/422.1 |
| 2012/0020393 A1 | 1/2012 | Patil et al. |
| 2013/0325957 A1* | 12/2013 | Mizuki et al. ................ 709/204 |

OTHER PUBLICATIONS

"3GPP TS 25.331 V8.1.0; Signalling connection release indication procedure; (Release 8);" Dec. 2007 (1 page).

Extended European Search Report in counterpart European Patent Application No. 13760514.3, dated Nov. 2, 2015 (7 pages).

* cited by examiner

MOBILE STATION AND RADIO BASE STATION

TECHNICAL FIELD

The present invention relates to a mobile station and a radio base station.

BACKGROUND ART

In 3GPP, a "Fast Dormancy function" is specified for the purpose of saving the batteries of mobile stations UE (see Non-patent Document 1).

With this "Fast Dormancy function," each mobile station UE is configured to transmit "SIGNALLING CONNECTION RELEASE INDICATION" to its radio access network (radio base station eNB) when detecting that there is no more data to be transmitted so that the mobile station UE can immediately transition to a "Preservation state."

Here, the radio access network (radio base station eNB) can control the interval of retransmission of the "SIGNALLING CONNECTION RELEASE INDICATION" from the mobile station UE by notifying the mobile station UE of the value of a timer T323.

PRIOR ART DOCUMENT

Patent Document

Non-Patent Document

Non-patent Document 1: 3GPP TS25.331 Chapter 8.1.14

SUMMARY OF THE INVENTION

With the existing "Fast Dormancy function," the mobile station UE transitions to the "Preservation state," and therefore an effect of reducing the battery and radio resource consumption of the mobile UE can be expected. However, the mobile station UE may frequently transition to the "Preservation state" and return to an "Active state" as in a case shown in FIG. 5 where transmission and reception of data of a small data amount such as periodic data by an application occur at the mobile station UE. In this case, there will be a problem in that the amount of signals increases due to the repetition of transition and return.

Thus, the present invention has been made in view of the above-mentioned problem, and an object thereof is to provide a mobile station and a radio base station capable of suppressing the increase in the amount of signals due to the repetition of transition to the "Preservation state" and return to the "Active state."

A first feature of the present invention is summarized as a mobile station including: a receiving unit configured to receive access restriction information against communication satisfying a predetermined condition during a "Preservation state," from a radio access network; and a transmitting unit configured to transmit a connection request signal to the radio access network in a case where the mobile station transitions from the "Preservation state" to an "Active state," in which the transmitting unit is configured to decide whether or not to transmit the connection request signal for the communication satisfying the predetermined condition, on the basis of the access restriction information.

A second feature of the present invention is summarized as a radio base station including a transmitting unit configured to notify a mobile station of restriction information against communication satisfying a predetermined condition during a "Preservation state."

MODE FOR CARRYING OUT THE INVENTION (Mobile Communication System According to First Embodiment of Present Invention)

A mobile communication system according to a first embodiment of the present invention will be described with reference to FIGS. 1 to 4.

The mobile communication system according to this embodiment may be a mobile communication system of an LTE (Long Term Evolution) scheme, a mobile communication system of a WCDMA (Wideband CDMA) scheme, or a mobile communication system of some other radio access network scheme.

Figure 1:
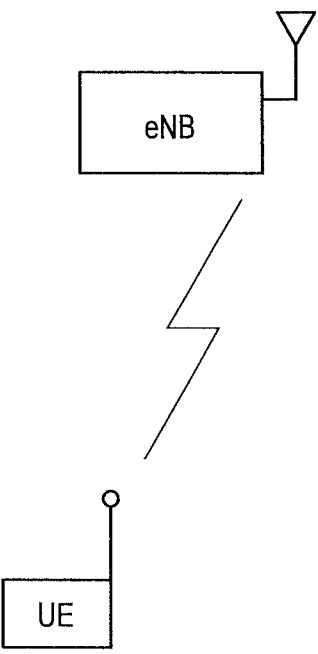
FIG. 1 is an overall configurational view of a mobile communication system according to a first embodiment of the present invention.

While this embodiment will be described below by taking a mobile communication system of an LTE scheme as an example, the present invention is applicable to a mobile communication system of the LTE scheme. Note that as shown in FIG. 1, the mobile communication system according to this embodiment includes a radio base station eNB and a mobile station UE.

Figure 2:
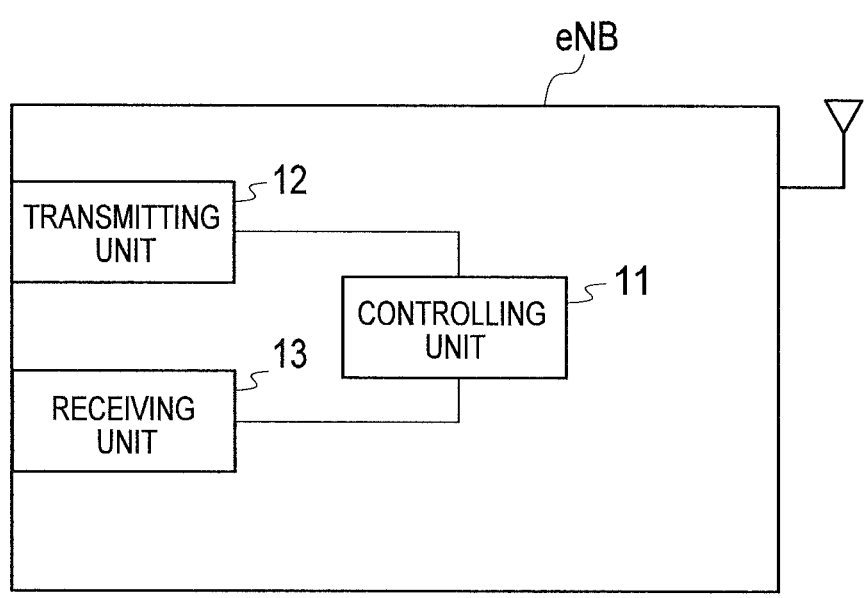
FIG. 2 is a functional block diagram of a radio base station according to the first embodiment of the present invention.

As shown in FIG. 2, the radio base station eNB according to this embodiment includes a controlling unit 11, a transmitting unit 12, and a receiving unit 13.

The transmitting unit 12 is configured to transmit various types of signals to the mobile station UE. The receiving unit 13 is configured to receive various types of signals from the mobile station UE.

For example, the transmitting unit 22 may be configured to notify the mobile station UE of restriction information against communication satisfying a predetermined condition during a "Preservation state."

Here, the communication satisfying the predetermined condition mentioned above may be data transmission and reception involving no user operation. Note that the data transmission and reception involving no user operation is, for example, transmission and reception of periodic data by an application such as a "Keep Alive signal," or the like.

Moreover, the restriction information contains, for example, restriction rate, back-off time, and the like.

For example, the receiving unit 23 may be configured to receive the above-mentioned "SIGNALLING CONNECTION RELEASE INDICATION," "RRC CONNECTION REQUEST," or the like from the mobile station UE.

The controlling unit 21 is configured to perform various types of control at the radio base station eNB.

For example, the controlling unit 21 may be configured to determine whether or not to cause the mobile station UE to transition to the "Preservation state," when the receiving unit 23 receives "SIGNALLING CONNECTION RELEASE INDICATION" from the mobile station UE.

Note that the transmitting unit 22 and the receiving unit 23 are configured to perform processing between themselves and the mobile station UE for causing the mobile station UE to transition to the "Preservation state" (specifically, processing for releasing the signalling connection of the mobile station UE) if the controlling unit 21 determines to cause the mobile station UE to transition to the "Preservation state."

Moreover, the controlling unit 21 can extract, from an "RRC CONNECTION REQUEST" received by the receiving unit 23, information for identifying whether or not the "RRC CONNECTION REQUEST" is for communication satisfying the predetermined condition and, based on this information, distinguish between "RRC CONNECTION REQUESTs" for communication satisfying the predetermined condition (e.g. data transmission and reception involving no user operation) and "RRC CONNECTION REQUESTs" for other kinds of communication (e.g. data transmission and reception involving a user operation).

Here, the data transmission and reception involving a user operation is, for example, data for browsing or the like.

Figure 3:
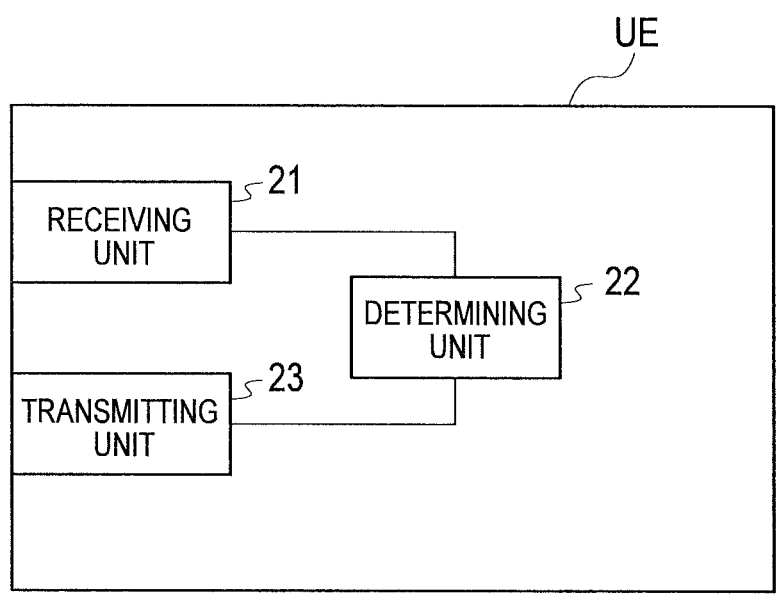
FIG. 3 is a functional block diagram of a mobile station according to the first embodiment of the present invention.

As shown in FIG. 3, the mobile station UE according to this embodiment includes a receiving unit 21, a determining unit 22, and a transmitting unit 23.

The receiving unit 21 is configured to receive various types of signals from a radio access network, i.e. the radio base station eNB. The transmitting unit 23 is configured to transmit various types of signals to a radio access network, i.e. the radio base station eNB.

The determining unit 22 is configured to determine whether or not communication which attempts to start when the mobile station UE is in the "Preservation state" is communication satisfying the predetermined condition.

For example, the determining unit 22 may be configured to make the above determination on the basis of a data amount notified of by the radio access network (radio base station eNB).

For example, the determining unit 22 may be configured such that in a case where communication of a smaller data amount than the above-mentioned data amount attempts to start, the determining unit 22 determines this communication as communication satisfying the predetermined condition.

Moreover, the determining unit 22 may be configured to make the above determination on the basis of a transmission interval notified of by the radio access network (radio base station eNB).

For example, the determining unit 22 may be configured such that in a case where a period of time equivalent to the transmission interval has not yet elapsed since completion of communication of the same data type in the same application, the determining unit 22 determines this communication as communication satisfying the predetermined condition.

Note that the timer that manages the transmission interval is different from the timer T323 mentioned earlier.

Further, the determining unit 22 maybe configured to make the above determination on the basis of a data type notified of by the radio access network (radio base station eNB).

For example, the determining unit 22 may be configured such that in a case where transmission and reception of periodic data by an application, which a type of data such as "Keep Alive signal," attempts to start, the determining unit 22 determines this communication as communication satisfying the predetermined condition.

Moreover, the receiving unit 21 is configured to receive access restriction information against communication satisfying the predetermined condition during the "Preservation state," from the radio access network (e.g. radio base station eNB) via broadcast information.

Moreover, the transmitting unit 23 is configured to transmit an "RRC CONNECTION REQUEST (connection request signal)" to the radio access network (e.g. radio base station eNB) in a case where the mobile station UE transitions from the "Preservation state" to an "Active state."

Here, the transmitting unit 23 is configured to decide whether or not to transmit an "RRC CONNECTION REQUEST" for communication satisfying the predetermined condition, on the basis of the access restriction information.

Moreover, in a case where the mobile station UE uses a "Fast Dormancy function," the transmitting unit 23 is configured to normally transmit "SIGNALLING CONNECTION RELEASE INDICATION" to the radio access network (radio base station eNB) upon detection of a situation where there is no more data to be transmitted.

Note that the transmitting unit 23 may be configured to include information in the "RRC CONNECTION REQUEST" for the radio access network (e.g. radio base station eNB), the information being information for identifying whether or not the "RRC CONNECTION REQUEST" is for communication satisfying the predetermined condition.

Hereinbelow, the operation of the mobile station according to this embodiment will be described with reference to FIG. 4.

Figure 4:
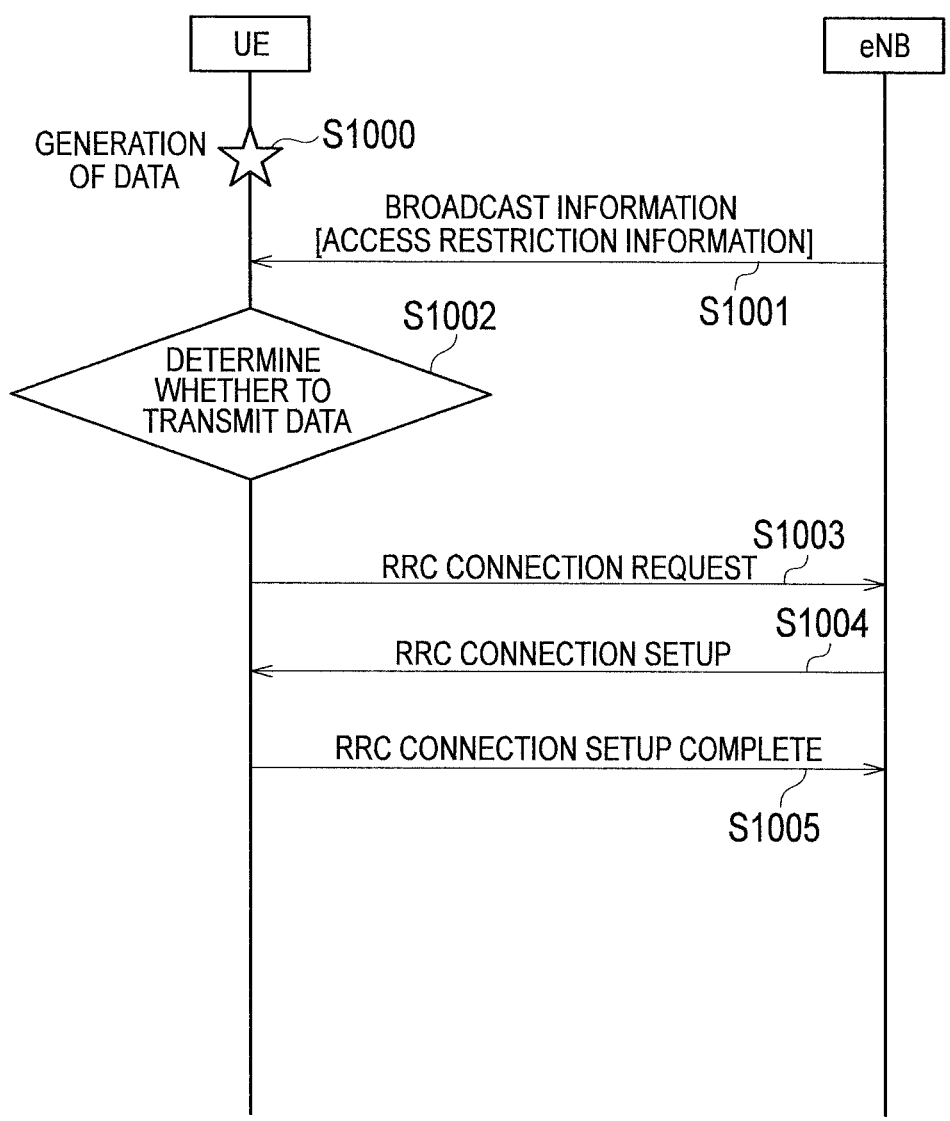
FIG. 4 is a sequence chart showing the operation of the mobile communication system according to the first embodiment of the present invention.
Figure 5:
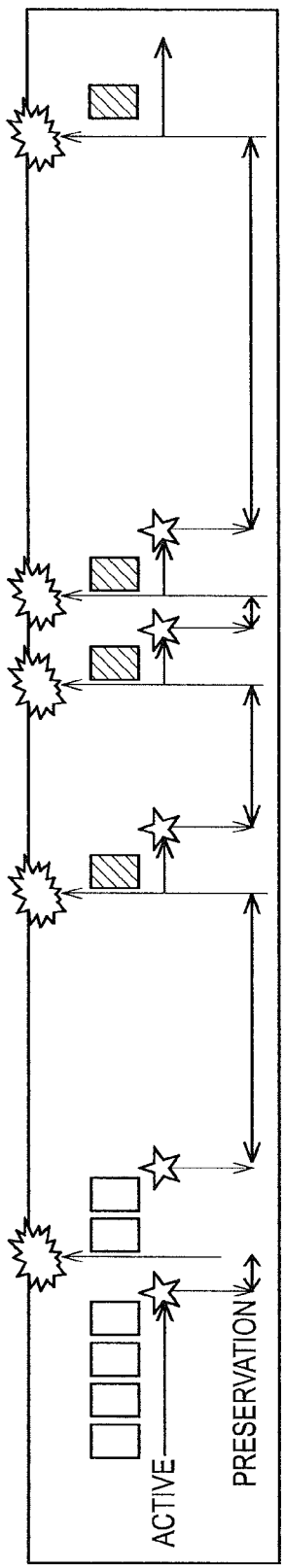
FIG. 5 is a diagram for describing a problem in a conventional mobile communication system.

As shown in FIG. 4, the mobile station UE in the "Preservation state" detects generation of data to be transmitted in step S1000, and receives access restriction information against communication satisfying the predetermined condition during the "Preservation state," from the radio base station eNB via broadcast information in step S1001.

In step S1002, based on the access restriction information, the mobile station UE decides whether or not to start communication of the generated data, that is, whether or not to transmit an "RRC CONNECTION REQUEST" for the communication.

For example, the mobile station UE makes the above decision on the basis of the access restriction information against communication satisfying the predetermined condition during the "Preservation state," if determining that the communication is communication satisfying the predetermined condition.

On the other hand, the mobile station UE makes the above decision on the basis of normal access restriction information if determining that the communication is not communication satisfying the predetermined condition.

In step S1003, the mobile station UE transmits an "RRC CONNECTION REQUEST" to the radio base station eNB. In step S1004, the radio base station eNB transmits "RRC CONNECTION SETUP" to the mobile station UE. In step S1005, the mobile station UE transmits "RRC CONNECTION SETUP COMPLETE" to the radio base station eNB.

According to the invention according to this embodiment, access restriction information against data transmission and reception involving no user operation during the "Preservation state" is used. In this way, it is possible to restrict only data transmission and reception involving no user operation from the mobile station UE in the "Preservation state."

As a result, frequent repetition of transition to the "Preservation state" and return to the "Active state" is avoided. Accordingly, the unnecessary increase in the amount of signals can be avoided.

The above-described features of the embodiment may also be expressed as follows.

A first feature of this embodiment is summarized as a mobile station UE including: a receiving unit 13 configured to receive access restriction information against communication satisfying a predetermined condition during a "Preservation state," from a radio access network (for example, a radio base station eNB); and a transmitting unit configured to transmit an "RRC CONNECTION REQUEST" to the radio access network (for example, the radio base station eNB) in a case where the mobile station UE transitions from the "Preservation state" to an "Active state," in which the transmitting unit 12 is configured to decide whether or not to transmit the "RRC CONNECTION REQUEST" for the communication satisfying the predetermined condition, on the basis of the access restriction information.

In the first feature of this embodiment, the transmitting unit 23 may be configured to include information in the "RRC CONNECTION REQUEST" for the radio access network (for example, the radio base station eNB), the information being information for identifying whether or not the "RRC CONNECTION REQUEST" is for the communication satisfying the predetermined condition.

In the first feature of this embodiment, the communication satisfying the predetermined condition described above may be data transmission and reception involving no user operation.

A second feature of this embodiment is summarized as a radio base station eNB including transmitting unit 12 configured to notify a mobile station UE of restriction information against communication satisfying a predetermined condition during a "Preservation state."

It should be noted that the foregoing operations of the mobile station UE and the radio base station eNB may be implemented by hardware, maybe implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-057388 (filed on Mar. 14, 2012) is incorporated by reference in the present specification.

INDUSTRIAL APPLICABILITY

As described above, according to the present invention, it is possible to provide a mobile station and a radio base station capable of suppressing the increase in the amount of signals due to the repetition of transition to the "Preservation state" and return to the "Active state."

EXPLANATION OF THE REFERENCE NUMERALS

UE mobile station
eNB radio base station
11 controlling unit
12, 23 transmitting unit
21, 13 receiving unit
22 determining unit

The invention claimed is:

1. A mobile station, comprising:
a receiving unit configured to receive access restriction information against communication satisfying a predetermined condition during a "Preservation state," from a radio access network; and
a transmitting unit configured to transmit a connection request signal to the radio access network in a case where the mobile station transitions from the "Preservation state" to an "Active state," wherein
the transmitting unit is configured to decide whether or not to transmit the connection request signal for the communication satisfying the predetermined condition, on the basis of the access restriction information.

2. The mobile station according to claim 1, wherein the transmitting unit is configured to include information in the connection request signal for the radio access network, the information being information for identifying whether or not the connection request signal is for the communication satisfying the predetermined condition.

3. The mobile station according to claim 2, wherein the communication satisfying the predetermined condition is data transmission and reception involving no user operation.

4. The mobile station according to claim 1, wherein the communication satisfying the predetermined condition is data transmission and reception involving no user operation.

* * * * *